R. E. PACK.
CHICKEN RENOVATOR.
APPLICATION FILED OCT. 26, 1916.
1,213,129.
Patented Jan. 16, 1917.
2 SHEETS—SHEET 1.
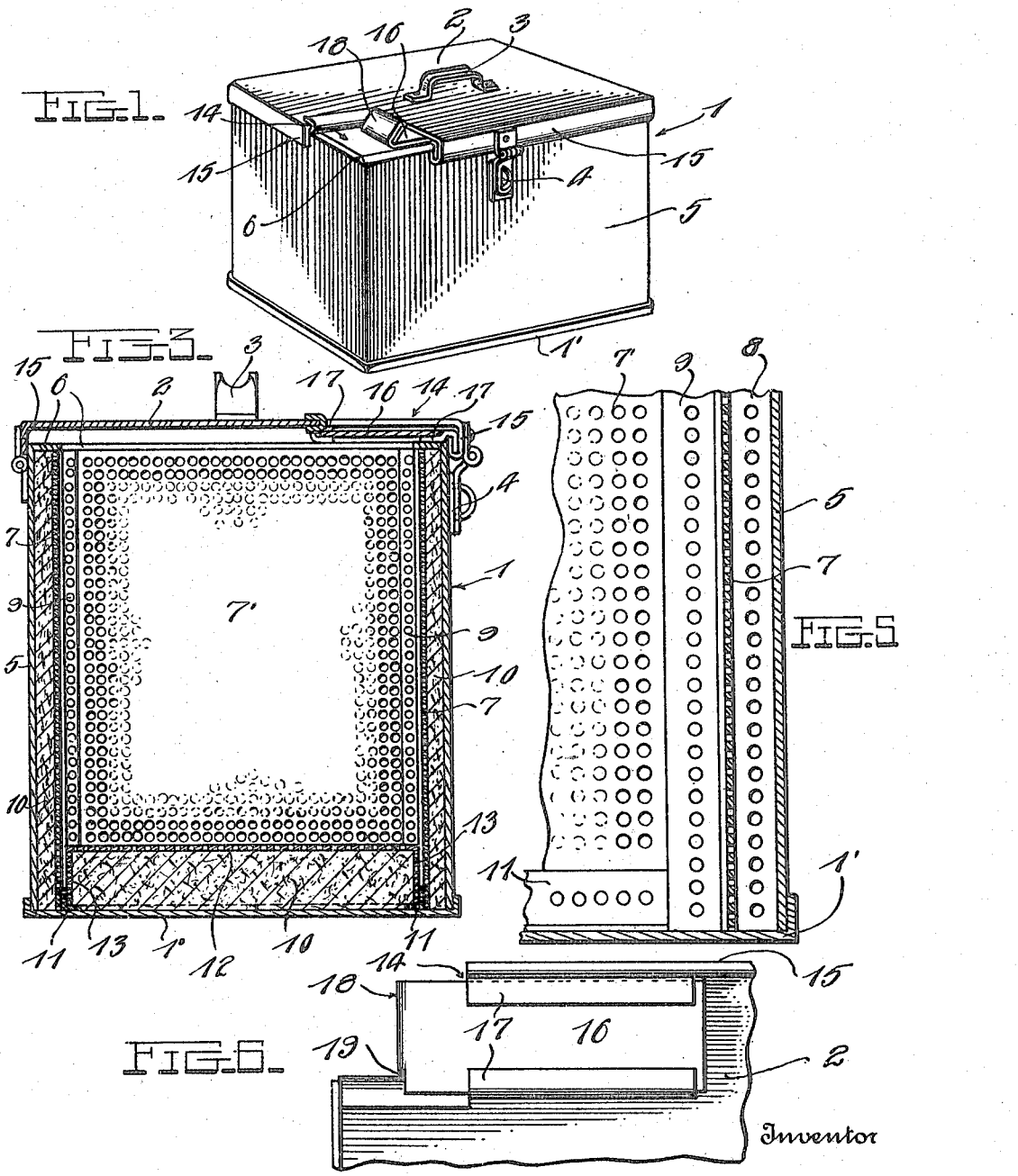
Witness
George W. Giovanetti
Inventor
R. E. Pack
By H. B. Willson & Co.
Attorneys

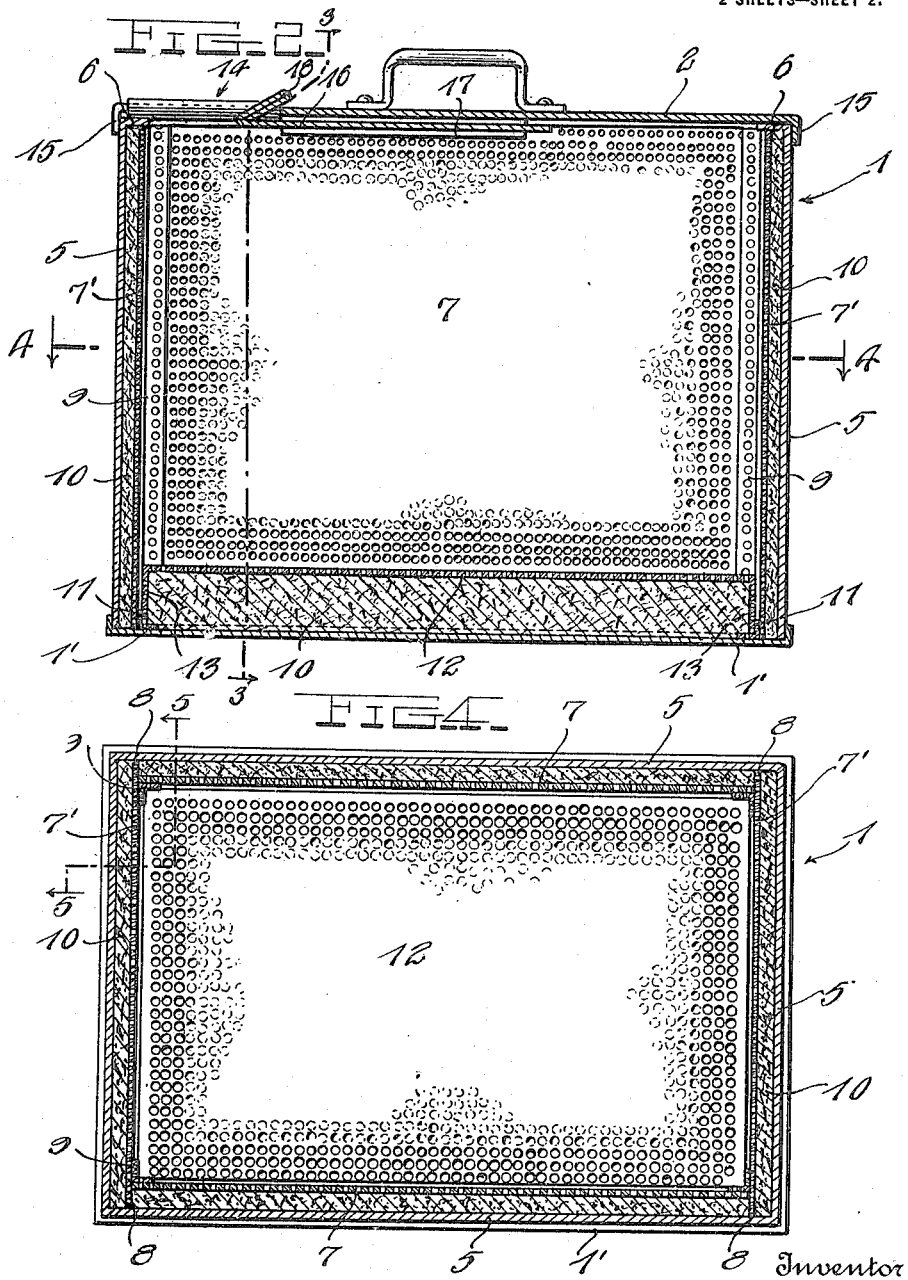

UNITED STATES PATENT OFFICE.

ROBERT E. PACK, OF SIOUX CITY, IOWA.

CHICKEN-RENOVATOR.

1,213,129.   Specification of Letters Patent.   Patented Jan. 16, 1917.

Application filed October 26, 1916.  Serial No. 127,866.

*To all whom it may concern:*

Be it known that I, ROBERT E. PACK, a citizen of the United States, residing at Sioux City, in the county of Woodbury and State of Iowa, have invented certain new and useful Improvements in Chicken-Renovators; and I do declare the following to be a full, clear, and exact description of the invention, such as will enable others skilled in the art to which it appertains to make and use the same.

This invention relates to improvements in vermin exterminators for poultry, and its object is to provide a very simply constructed renovator which can be inexpensively manufactured and which will be very efficient in operation.

An additional object is to provide a novel means for holding a suitable insecticide in suspension within the receptacle forming the renovator.

Still another object is to provide a very simply constructed closure through which the head of the fowl may be inserted during the operation.

With these and many other objects in view, the invention resides in the novel features of construction, combination, and arrangement of parts which will be hereinafter more particularly described and claimed and shown in the drawings wherein:

Figure 1 is a perspective view of a renovator constructed in accordance with my invention; Fig. 2 is a vertical longitudinal section through the same; Fig. 3 is a vertical transverse section on the plane of the line 3—3 of Fig. 2; Fig. 4 is a horizontal section on the plane of the line 4—4 of Fig. 2; Fig. 5 is a detail fragmentary section taken substantially on the plane of the line 5—5 of Fig. 4; and Fig. 6 is a fragmentary plan view of a portion of the cover of the device.

From the accompanying illustrations, it will be seen that this invention comprises a substantially rectangular sheet metal receptacle in the form of a box 1 of such a size that it will readily accommodate a chicken or other species of poultry. The top of the box is open and provided with a hinged cover 2 on which is formed a handle 3 in order that the device may be transported from place to place. The cover is further provided with a suitable hasp 4 by which it may be retained in closed position.

The receptacle is preferably provided with an absorbent lining by which a suitable insecticide may be held within the same in order to fumigate any poultry which may be placed therein. The outer walls 5 of the box are imperforate and have their upper edges bent inwardly toward each other to provide flanges 6. It will be seen from Fig. 2 that these flanges extend inwardly at right angles and that the cover 2 rests thereupon when it is in closed position. Spaced inwardly from the imperforate outer walls 5 are the perforated walls 7 and 7', the latter being formed of plates of reticulated material. The walls 7 and 7' extend from the bottom 1' of the box to the flanges 6 thereof and are secured to the said flanges by soldering or by other means.

The walls 7' which are spaced inwardly from the ends of the receptacle have their opposite edges engaged with the side walls of the box as shown at 8 in Fig. 4 and the walls 7 are secured to the first mentioned walls 7' by means of the angle metal strips 9. This arrangement reliably spaces the walls 7 and 7' from the walls 5 of the box so that an absorbent material such as the sawdust 10 may be disposed therebetween. The lower edges of the walls 7 and 7' are further held by means of the additional angle metal strips 11, the horizontal flanges of which engage the bottom 1', while the vertical flanges engage said walls.

A false bottom 12 is preferably provided for the box, said bottom being formed of material similar to the walls 7 and 7' and between which and the bottom 1', an absorbent material may be disposed if desired. In order to space the false bottom 12 from the bottom 1' the edges of the plate of material from which the former is constructed, are bent downwardly to form flanges 13, these resting upon said bottom 1' as shown in Fig. 2.

When it is desired to kill the vermin on a fowl the absorbent material 10 is saturated with a suitable liquid whose fumes will kill the parasites. Then the fowl is placed within the box and the cover 2 closed, the fowl's head, however, being projected through an opening 14 formed by cutting away one corner of the cover 2. This is the only opening through which any of the fumes from the solution on the absorbent material might escape, since the edges of the top or cover 2 are bent downwardly around the sides of the box to form flanges 15, thereby producing an airtight closure.

In order to conserve the fumes within the box, a sliding cover 16 is provided for closing the opening 14. This closure 16 is in the form of a flat rectangular plate of a width somewhat greater than the width of the opening 14 and it is designed to slide on the inner surface of the top cover 2. In order to retain the closure 16 in position, channel-shaped guides 17 are secured to the inner surface of said cover 2 and the distance between these guides is substantially equal to the width of the closure 16. A finger piece 18 by which the closure may be actuated is provided, one end being bent upwardly as shown, said finger piece projecting above the cover 2 so that it is readily accessible.

The inner end of the finger piece is cut away as shown at 19 since it would otherwise contact with one edge of the opening and interfere with the sliding of the closure. The end of this closure adjacent the cut away portion 19 is designed to engage one flange 15 of the top 2 to limit the outward movement thereof, the inward movement being limited by the engagement of the finger piece 18 with one edge of the opening 14. This opening as will be readily seen can be adjusted by means of the sliding plate 16 to various sizes in order to accommodate the heads of fowls of different sizes. When the closure is drawn tight against the neck of the fowl its head will be retained outside of the box and very little of the fumes will escape.

Since the receptacle is practically airtight when not in use, it will not be necessary to renew the solution of the absorbent material, except at extended periods. This renders the operation of the device very inexpensive and at the same time very efficient.

I claim:

1. A device of the class described comprising a sheet metal receptacle having outer imperforate walls, the upper edges of said walls being bent inwardly toward each other and at right angles to the main portions thereof, an inner wall spaced from the outer wall formed of plates of reticulated material, the plates adjacent the ends of the receptacle being extended into engagement with the side walls of the latter, the side edges of the other plates engaging the first mentioned plates, angle metal strips secured to the corners of said inner wall to hold said plates together, additional angle metal strips secured to the bottom edges of said plates and the bottom of said receptacle, the top edge of said plates being secured to the inwardly bent edges of the outer wall, a removable reticulated bottom spaced from the bottom of said receptacle, absorbent material between said inner and outer walls, a cover for the receptacle, said cover having an opening in one corner, and a slidable closure for said opening.

2. A device of the class described comprising a receptacle, absorbent material lining the inner walls of said receptacle, a cover hinged to said receptacle, the edges of said cover being bent downwardly around the sides of said receptacle to form flanges, said cover and its flanges being cut away at one corner to provide an opening, channel-shaped guides secured to the inner side of said cover, said guides being spaced apart a distance greater than the width of said opening, and a plate slidable in said guides to cover said opening, said plate being wider than said opening, one end of said plate being bent to form a finger piece, one end of the latter being cut away, the edge of said plate adjacent said cut away portion engaging one flange of the cover to limit its movement in one direction, movement in the other direction being limited by the engagement of said finger piece with one edge of said opening.

In testimony whereof I have hereunto set my hand in the presence of two subscribing witnesses.

ROBERT E. PACK.

Witnesses:
 FOSTER G. IDDINGS,
 CHAS. LOCKIE.

Copies of this patent may be obtained for five cents each, by addressing the "Commissioner of Patents Washington, D. C."